T. C. Richards,

Picture-Nail Head.

No. 2,936. Reissued May 19, 1868.

Witnesses:
W. C. Ashlewitz
J. Spaser

Inventor:
T. C. Richards
per Munn & Co.
Attorneys.

N. PETERS, PHOTO-LITHOGRAPHER, WASHINGTON, D. C.

United States Patent Office.

THOMAS C. RICHARDS, OF NEW YORK, N. Y.

*Letters Patent No.* 72,905, *dated December* 31, 1867; *reissue No.* 2,936, *dated May* 19, 1868.

IMPROVEMENT IN ATTACHING ORNAMENTAL HEADS TO NAILS AND SCREWS.

The Schedule referred to in these Letters Patent and making part of the same.

TO ALL WHOM IT MAY CONCERN:

Be it known that I, THOMAS C. RICHARDS, of the city, county, and State of New York, have invented a new and useful Improvement in Attaching Ornamental Heads to Nails, Screws, &c.; and I do hereby declare that the following is a full, clear, and exact description thereof, which will enable others skilled in the art to make and use the same, reference being had to the accompanying drawings, forming part of this specification.

This invention relates to a new and improved mode of attaching ornamental heads to nails, screws, &c., whereby said nails may, with the greatest facility, be applied to the screw or nail after the same has been driven or screwed in a wall or other fixture.

The object of the invention is to obtain an economical means for effecting the object, as well as one which will admit of the ornamental head being adjusted expeditiously on the nail or screw.

In the accompanying sheet of drawings—

Similar letters of reference indicate corresponding parts.

Figure 1:
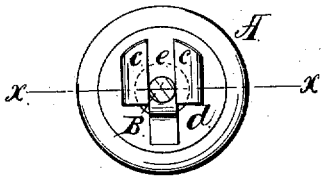
Figures 1 and 2 represent inner side views of ornamental heads for nails and screws.
Figure 3:
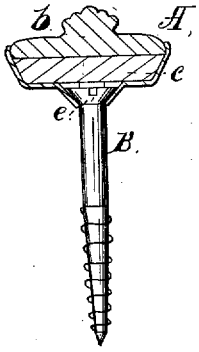
Figures 3 and 4 represent sectional views of the same, taken in the line *x x*, fig. 1.

A, figs. 1 and 3, represents an ornamental head for a nail or screw, in this instance shown applied to a screw, B. This head is composed of a socket, *a*, struck up out of a single piece of sheet metal, and having the ornamental part, *b*, which may be of glass, porcelain, or other material, fitted in it, and bearing against a wooden or other filling, *c*, (see fig. 3.) The inner side of this head, which is the bottom or rear side of the socket *a*, is slitted to admit of three lips, *c*, *c*, and *d*, being turned outward, to form a recess or groove to receive the head *e* of the screw B, the lip serving as a step at one end of the recess or groove.

It will be seen that after the screw B is screwed into the wall or other fixture, the ornamental head A may be fitted on the head *e* of the screw with the greatest facility.

Figure 2:
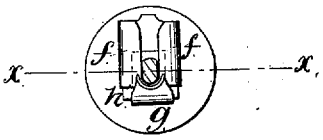
Figure 4:
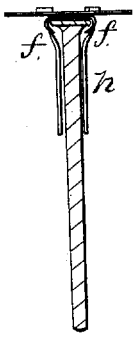

This recess or groove may, if desired, be formed out of a separate piece of metal, as shown in figs. 2 and 4, the sides of the metal being turned over, as shown at *f f*, and one end notched at each side and turned over, to form the stop *g*, which corresponds to the lip *d* in fig. 1. This piece of metal may be secured to the inner side or bottom of the socket by solder or otherwise.

By this simple means ornamental heads may be attached to nails and screws with the greatest facility, and in the most economical way possible.

If desired, a sheath, *h*, may extend from the socket *a* to rest upon a portion of the nail or screw.

Having described my invention, I claim as new, and desire to secure by Letters Patent—

The attaching of ornamental heads to nails and screws by means of a clasping-recess or groove formed on or attached to the inner side of the ornamental head, so as to admit the lateral or transverse insertion of the head proper of the nail or screw, substantially as shown and described.

The above specification of my invention signed by me, this 24th day of January, 1868.

T. C. RICHARDS.

Witnesses:

WM. F. MCNAMARA,

A. F. ROBERTS.